US006370758B1

(12) United States Patent
Theis

(10) Patent No.: US 6,370,758 B1
(45) Date of Patent: Apr. 16, 2002

(54) SLEEVED/INTERFERENCE FIT (THREADED) FASTENER INSTALLATION TOOL

(75) Inventor: Paul Edmund Theis, Covina, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/692,791

(22) Filed: Oct. 20, 2000

Related U.S. Application Data

(62) Division of application No. 09/170,357, filed on Oct. 13, 1998, now Pat. No. 6,178,614.

(51) Int. Cl.[7] .................................................. B23Q 7/00
(52) U.S. Cl. .............................. 29/559; 29/252; 29/264
(58) Field of Search .......................... 29/252, 559, 264, 29/263, 256; 254/93 H, 93 R

(56) References Cited

U.S. PATENT DOCUMENTS

| | | | | |
|---|---|---|---|---|
| 2,475,040 A | | 7/1949 | Mandl | |
| 2,736,219 A | | 2/1956 | May | |
| 2,760,393 A | | 8/1956 | Stough | |
| 2,866,370 A | | 12/1958 | Biach | |
| 4,507,838 A | * | 4/1985 | Hacker | 29/264 |
| 4,872,254 A | | 10/1989 | Chancellor | |
| 5,060,359 A | | 10/1991 | Muir | |
| 5,075,948 A | * | 12/1991 | Maier | 29/264 |
| 5,208,958 A | | 5/1993 | Wilcox | |
| 5,416,963 A | | 5/1995 | Boynton | |
| 5,839,180 A | * | 11/1998 | Hochmiller | 29/264 |

* cited by examiner

*Primary Examiner*—Joseph J. Hail, III
*Assistant Examiner*—Daniel Shanley
(74) *Attorney, Agent, or Firm*—Terry J. Anderson

(57) ABSTRACT

An apparatus and method for installing a threaded fastener having a sleeved or interference fit into a workpiece. The apparatus of the present invention includes a pulling device for pulling the threaded fastener into the workpiece, an adapter for connecting the threaded fastener and the pulling device, and a collar that fits over the adapter for allowing the adapter to more inside the collar when subject to a pulling force from the pulling device. In addition, the aforementioned apparatus may be used in a method for installing the threaded fastener having a sleeved or interference fit into the workpiece. The method includes inserting the threaded fastener into the workpiece until the threads of the fastener are exposed on the other side of the workpiece, attaching an adapter to the threaded fastener, placing the collar over the adapter and attaching the pulling device. The pulling device is then pressurized so as to pull the threaded fastener into the workpiece until the threaded fastener is fully seated.

4 Claims, 2 Drawing Sheets

SLEEVED/INTERFERENCE FIT (THREADED) FASTENER INSTALLATION TOOL

RELATED APPLICATIONS

The present application is a divisional of U.S. application Ser. No. 09/170,357 entitled SLEEVED/INTERFERENCE FIT (THREADED) FASTENER INSTALLATION TOOL filed Oct. 13, 1998, now U.S. Pat. No. 6,178,614.

STATEMENT RE: FEDERALLY SPONSORED RESEARCH/DEVELOPMENT

This invention was made with Government support under contract N00019-92-C-0059 awarded by the United States Navy. The Government has certain rights in this invention.

FIELD OF THE INVENTION

The present invention relates in general to fasteners and more particularly to an apparatus and method for installing a threaded fastener having a sleeved or interference fit into a workpiece.

BACKGROUND OF THE INVENTION

Threaded fasteners having a sleeved or interference fit are widely used in several applications including automobile, aircraft and general machinery. Typically, these fasteners are installed into a workpiece thereby enabling one or more other structures to be attached to the workpiece. The type of workpiece depends on the application, and may, for example, include a stringer in an aircraft or a suspension beam in an automobile.

Installation generally involves seating the fastener in the workpiece. Seating commonly means that the fastener is frictionally fitted in the workpiece such that the fastener will not dislodge. In other words, the frictional or contact area between the surface of the workpiece and the fastener is enough to keep the fastener securely in the workpiece. One way to identify when the fastener is seated in the workpiece is when the fastener is installed far enough into the workpiece that the flanged head on one end of the fastener contacts the workpiece.

Typically, a great deal of force is required to install the fastener into the workpiece. Most fasteners, therefore, are installed into the workpiece either by pressing or by hammering. Although both of these methods provide the necessary force required, several problems exist.

One problem with pressing the fastener into the workpiece is that the fastener can easily become off-center. This can lead to incorrect installation of the fastener or, even worse, bending of the fastener. Because fastener installation usually occurs on a production line, this can lead to production delays and increased production costs.

One problem with hammering the fastener into the workpiece is that this method develops the needed force by high impact with the fastener. This high impact can do great damage to the fastener and workpiece and cause them to bend, crack or even break. Moreover, these anomalies may not be noticed during production and may lead to premature failure of the fastener.

Therefore, what is needed is an apparatus and a method for installing a fastener into a workpiece that can supply the necessary force without high impact. Furthermore, the apparatus and method should be able to install the fastener reliably and safely without the danger of bending, cracking or breaking the fastener or workpiece. The safety and reliability of this apparatus and method would increase yield and quality, decrease production time and thereby decrease production costs.

Whatever the merits of the aforementioned tools and methods for installing fasteners, they do not achieve the benefits of the present invention.

SUMMARY OF THE INVENTION

To overcome the limitations in the prior art as described above and other limitations that will become apparent upon reading and understanding the present specification, the present invention includes an apparatus and method for installing a threaded fastener having a sleeved or interference fit into a workpiece. The present invention is capable of reliably and safely installing a fastener in a workpiece without damage to either the fastener or workpiece. Furthermore, the safe and reliable way in which the invention installs a fastener can have a beneficial effect on the production process.

The apparatus of the present invention includes a pulling device for pulling a fastener into the workpiece, an adapter for connecting the fastener and the pulling device and a collar that fits over the adapter for allowing the adapter to move inside the collar when subject to a pull from the pulling device.

The apparatus of the present invention may also be implemented as a method of installing a threaded fastener having a sleeved or interference fit into a workpiece. This method includes inserting a fastener, threaded end first, into a hole in the workpiece until the threads are exposed on the other side of the workpiece. Next, an adapter is attached to the threaded portion of the fastener and a collar is placed over the adapter. A pulling device is then attached to the other end of the adapter. When the pulling device applies enough pressure, the fastener is pulled into the workpiece until it is fully seated.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
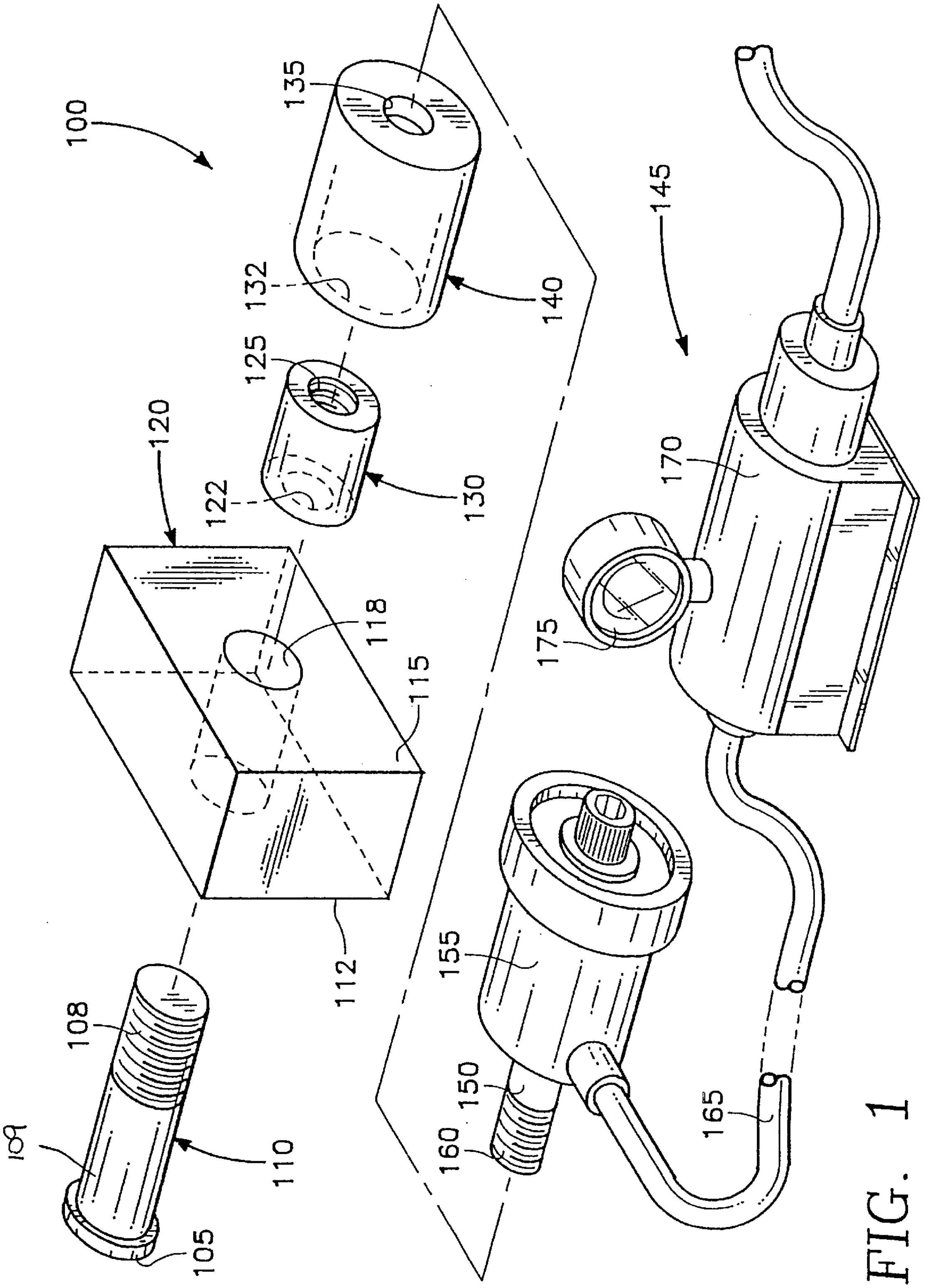
FIG. 1 is an overview of the present invention showing the fastener, workpiece and the apparatus of the present invention.

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention.

I. Introduction

As shown in the drawings for purposes of illustration, the present invention is embodied in an apparatus for installing a threaded fastener having a sleeved or interference fit into a workpiece. The installation is accomplished by smoothly pulling the fastener into the workpiece. Existing methods of installation generally use either pressing or hammering that use either pushing or high impact to develop the necessary force. This pushing or high impact can cause bending, cracking or breaking of the fastener and workpiece.

II. Structure of the Invention

Figure 2:
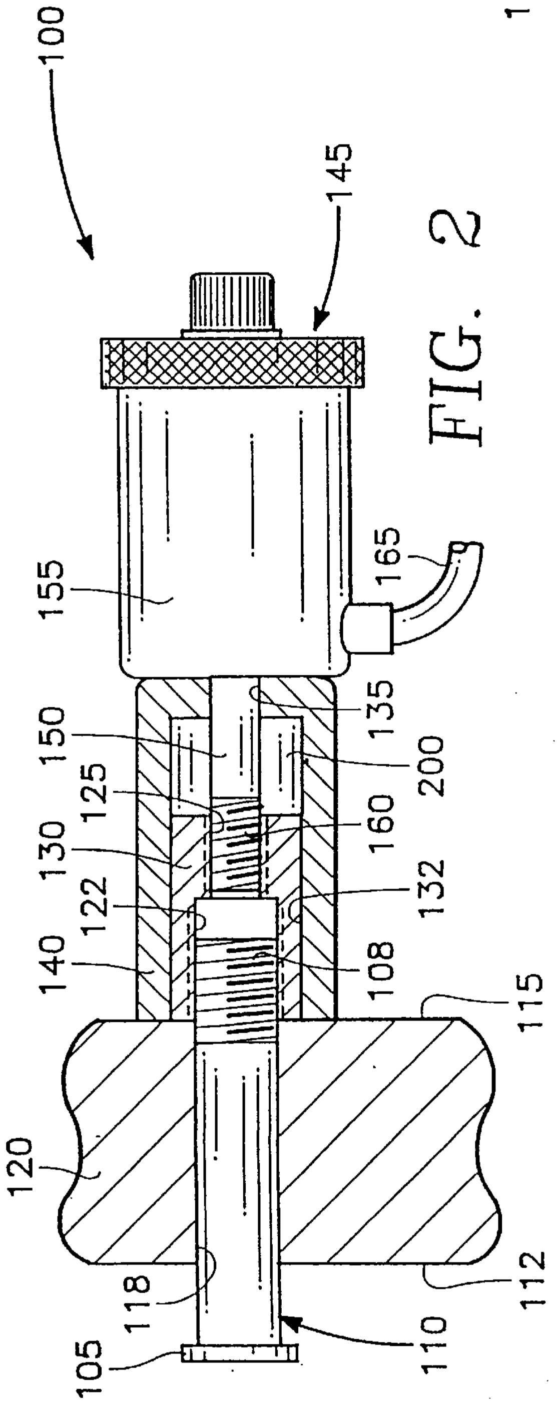
FIG. 2 is a side view, partial cut-away, showing the apparatus of FIG. 1 connected to the unseated fastener and workpiece and unpressurized.
Figure 3:
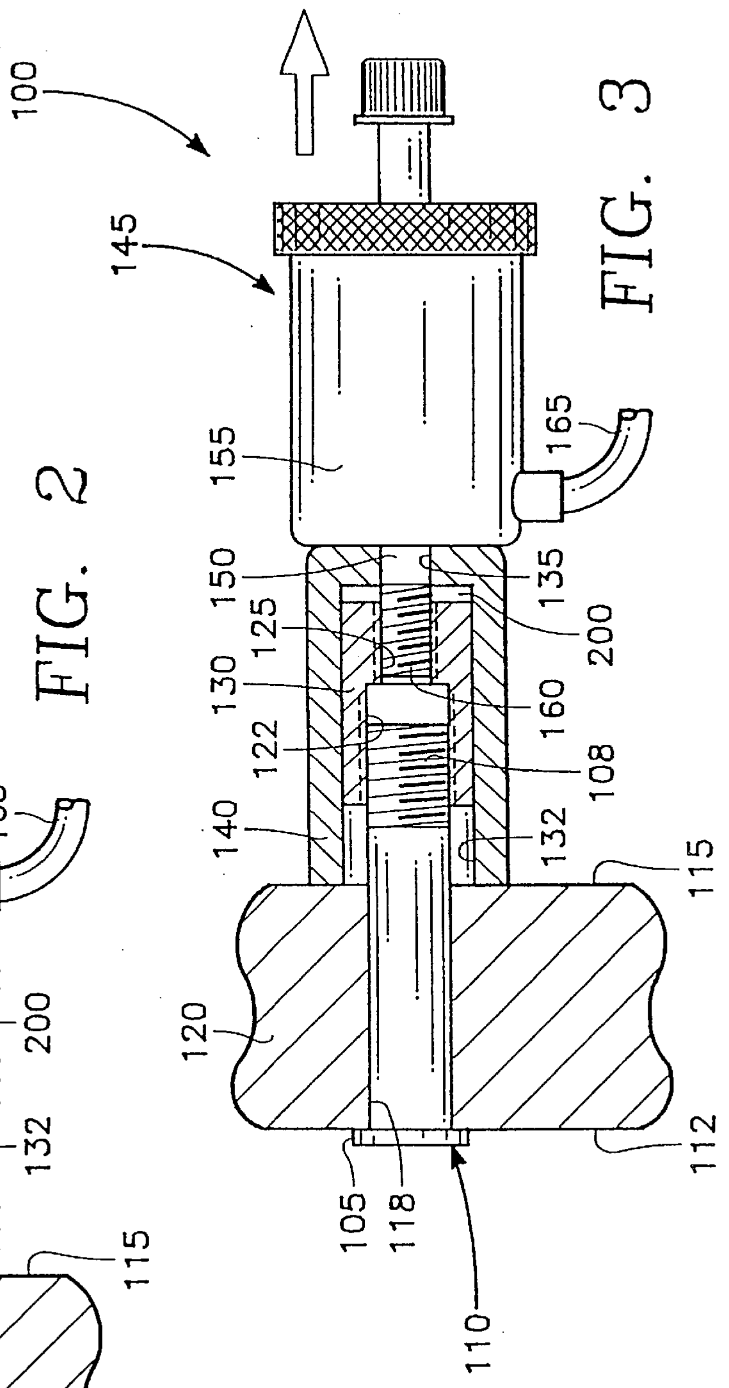
FIG. 3 is a side view, partial cut-away, showing the apparatus of FIGS. 1 and 2 pressurized and with the fastener seated in the workpiece.

FIGS. 1, 2 and 3 illustrate the threaded fastener installation tool of the present invention. The new threaded fastener installation tool 100 includes an adapter 130, a collar 140, a pulling device 145 and a hydraulic unit bolt 150. The tool 100 is used to install a threaded fastener 110 into a workpiece 120.

Referring to FIG. 1, shown is the threaded fastener installation tool 100 along with the threaded fastener 110 and the workpiece 120. Typically, the threaded fastener 110 has a flanged head 105 on one end for contacting the workpiece surface when the fastener is fully seated in the workpiece 120. Further, the fastener 110 has an externally threaded male portion 108 on the opposing end for facilitating the attachment of a similarly threaded female portion. The fastener 110 further has a shank portion 109 which is disposed between the flanged head 105 and externally threaded male portion 108 and defines a generally smooth or continuous outer surface.

The workpiece 120 is the object to which the threaded fastener 110 is ultimately secured. This workpiece 120 may be various shapes and sizes and be made from a variety of materials. The workpiece 120 includes a first side 112 and a second side 115. Furthermore, the workpiece 120 has an adapter hole 118 between the first side 112 and the second side 115 into which the threaded fastener 110 is placed through. Preferably, the adapter hole 118 has a diameter large enough to allow the externally threaded male portion 108 to be advanced into the adapter hole 118 at the first side 112 and emerge on the second side 115 (i.e., the externally threaded male portion 108 is extensible through the adaptor hole 118). However, the adapter hole 118 has a small enough diameter so that at least a section of the neck portion 109 adjacent the flanged head 105 is not advanceable into the adaptor hole 118, thus not allowing the flanged head 105 to contact the first side 112 without pressing or hammering the flanged head 105 or using the present invention.

The adapter 130 has a first internally threaded female portion 122 extending within one end for attachment to a male threaded fastener. Preferably, the first internally threaded female portion 122 is threaded such that the fastener threaded male portion 108 screws into the first threaded female portion 122. Furthermore, a second internally threaded female portion 125 extends within the opposing end of the adapter 130 and also facilitates attachment to a male threaded fastener. The first threaded female portion 122 and the second threaded female portion 125 do not necessarily have the same thread pitch and fastener diameter.

The collar 140 has an opening 132 which has a diameter large enough to permit the adapter 130 to fit inside the collar 140. In addition, there is a collar hole 135 on the opposing end of the collar 140 having a large enough diameter to allow the hydraulic unit bolt 150 to pass therethrough.

Preferably, the pulling device 145 includes a hydraulic unit 155 for pulling the threaded fastener 110 into the workpiece 120. In the preferred embodiment this hydraulic unit 155 is of the type sold under the name Enerpac®. Located within the hydraulic unit 155 is the hydraulic unit bolt 150. The hydraulic unit bolt 150 has a bolt threaded male portion 160 on one end for attaching the hydraulic unit 155 to the adapter 130. In this respect, the bolt threaded male portion 160 is preferably threaded so that it screws into the second internally threaded female portion 125 of the adaptor 130.

A hydraulic unit hose 165 provides a pathway for hydraulic fluid between the hydraulic unit 155 and a pump 170. The pump 170 provides pressure in the hydraulic unit 155 and includes a pressure gauge 175 for measuring that pressure.

Although the pulling device 145 of the preferred embodiment is hydraulic, alternatively it may be pneumatic or virtually any system that creates enough pressure to pull the threaded fastener 110 into the workpiece 120.

III. Operation of the Invention

The apparatus and method of the present invention is very useful for installing a threaded fastener into a workpiece. Specifically, the apparatus and method permit the threaded fastener to be pulled into the workpiece rather than pressed or hammered into the workpiece. Thus, the present invention has the advantage of preventing the cracking and deformation of the fastener as may occur when the fastener is pressed or hammered into the workpiece.

FIGS. 2 and 3 illustrate the operation of the apparatus shown in FIG. 1 and describe above. FIG. 2 shows the apparatus fully attached and not yet pressurized. Specifically, the threaded fastener 110 is shown inserted into the adapter hole 118 though the first side 112 of the workpiece 120 such that the fastener threaded male portion 108 is partially exposed on the second side 115.

Furthermore, the adapter 130 is connected to the threaded fastener 110 by threadably engaging the partially exposed fastener threaded male portion 108 to the first threaded female portion 122. The collar 140 is positioned over the adapter 130 such that the adaptor 130 fits inside the collar 140 as shown. In addition, the hydraulic unit bolt 150 is placed through the collar hole 135 and connected to the adapter 130. This connection is made by threadably engaging the second threaded female portion 125 to the bolt threaded male portion 160. Preferably, the end of the collar 140 defining the collar opening 132 contacts the second side 115, with the opposite end of the collar 140 defining the collar hole 135 contacting the hydraulic unit 155.

In this position the hydraulic unit 155 is unpressurized. Moreover, there is an inner cavity 200 inside the collar 140 to permit the adapter 130 to move toward the hydraulic unit 155 when it is pressurized.

FIG. 3 shows the apparatus of FIGS. 1 and 2 pressurized and having completed the pulling of the threaded fastener 110 into the workpiece 120. In particular, the hydraulic unit 155 has been pressurized and the pressure is high enough such that the adapter 130 is pulled toward the hydraulic unit 155.

This pulling of the adapter 130 toward the hydraulic unit 155 leads to at least two results. First, the inner cavity 200 is reduced or eliminated. Second, and more importantly, the threaded fastener 110 is pulled into the workpiece 120. Preferably, the threaded fastener 110 is pulled as far as possible into the workpiece, or, in other words, until the flanged head 105 contacts the first side 112 of the workpiece 120. At this point the installation of the threaded fastener 110 is complete, and the tool 100 can be removed and threaded fastener 110 and workpiece 120 are ready for use.

The apparatus of the present invention may also be implemented as method of installing a threaded fastener into a workpiece using the threaded fastener installation tool as described above. Referring again to FIG. 1, the method preferably includes inserting the threaded fastener 110 into the workpiece 120 on the first side 112 of the workpiece 120 until the fastener threaded male portion 108 at least partially emerges from the second side 115.

Next, the adapter 130 is connected to the threaded fastener 110 by engaging the fastener thread male portion 108 on the first threaded female portion 122. The collar 140 is then slipped over the adapter 130 so that the adapter 130 is completely inside the collar 140 and the collar opening 132 contacts the second side 115 of the workpiece 120.

The hydraulic unit 155, preferably an Enerpac® hollow plunger hydraulic cylinder, is next attached to the adapter 130 by using the hydraulic unit bolt 150. Specifically, the adapter 130 and hydraulic unit bolt 150 are connected by engaging the bolt threaded male portion 160 to the second threaded female portion 125. At this point the tool 100 is unpressurized and is configured as shown in FIG. 2.

As shown in FIG. 3, the tool 100 is then pressurized using the pump 170. Pressure is applied until the flanged head 105 of the threaded fastener 110 contacts and is completely seated against the first side 112 of the workpiece 120. At this point, installation is now complete and the tool 100 is disassembled from the threaded fastener 110 and workpiece 120. If desired, a nut (not shown) may be placed on the exposed section of the threaded male portion 108 of the threaded fastener 110 which protrudes from the second side 115 of the workpiece 120.

From the foregoing it will be appreciated that the apparatus and method of the present invention offers numerous advantages. In particular, the need for seating the threaded fastener in the workpiece by pressing or hammering the flanged head are eliminated. Moreover, there is no impact force associated with the installation of the threaded fastener in the workpiece. Namely, the fastener installation is accomplished by a smooth, continuous pulling force. Consequently, the danger of bending, cracking, breaking or deforming the threaded fastener is greatly reduced or eliminated. Thus, the apparatus and method of the present invention provide an effective and efficient way to install a threaded fastener into a workpiece. Furthermore, the safety and reliability the apparatus and method can increase yield and quality, decrease production time and thereby decrease production costs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention, be limited not by this detailed description, but rather by the claims appended hereto.

What is claimed is:

1. A method of pulling a fastener having an enlarged head and an externally threaded male portion into a workpiece having opposed first and second faces and a hole extending therebetween to achieve an interference fit between the fastener and the workpiece, the method comprising the steps of:

(a) inserting the fastener into the hole such that at least a portion of the male portion protrudes from the second face of the workpiece;

(b) attaching an adaptor to the male portion of the fastener;

(c) advancing a collar over the adaptor;

(d) attaching a pulling device to the adaptor; and (e) exerting a pulling force on the fastener via the pulling device until the fastener is seated within the workpiece.

2. The method of claim 1 wherein:

step (b) comprises threadably engaging the adaptor to the male portion of the fastener; and step (d) comprises threadably engaging the pulling device to the adaptor.

3. The method of claim 1 wherein step (e) comprises exerting the pulling force on the fastener until such time as the head of the fastener comes into abutting contact with the first face of the workpiece.

4. The method of claim 1 further comprising the steps of:

(f) removing the collar from over the adaptor; and (g) detaching the adaptor from the male portion of the fastener.

* * * * *